United States Patent [19]

Argueso

[11] Patent Number: 5,006,583

[45] Date of Patent: Apr. 9, 1991

[54] FILLER AND WAX COMPOSITION FOR INVESTMENT CASTING

[75] Inventor: Peter G. Argueso, Waccabuc, N.Y.

[73] Assignee: M. Argueso & Co., Inc., Mamaroneck, N.Y.

[21] Appl. No.: 232,476

[22] Filed: Aug. 15, 1988

[51] Int. Cl.$^5$ .................. C08L 47/00; B28B 7/28
[52] U.S. Cl. ...................... 524/277; 524/77;
524/275; 524/487; 524/488; 524/489; 524/577;
528/502; 428/402; 106/38.6; 106/38.8;
106/230; 106/272
[58] Field of Search .............. 524/275, 277, 577, 487,
524/488, 77, 489; 106/38.8, 272, 230, 38.6;
428/402; 525/332.2; 528/502

[56] References Cited

U.S. PATENT DOCUMENTS

| | | | |
|---|---|---|---|
| 3,409,566 | 11/1968 | Levendusky | 521/29 |
| 3,509,078 | 4/1970 | Roubinek et al. | 521/29 X |
| 3,554,949 | 1/1971 | Burke, Jr. | 106/272 X |
| 3,561,685 | 2/1971 | Feder | 241/55 |
| 3,854,962 | 12/1974 | Speyer | 106/38.8 X |
| 3,880,790 | 4/1975 | McLaren et al. | 524/577 X |
| 4,404,346 | 9/1983 | Pirotta et al. | 528/502 X |

FOREIGN PATENT DOCUMENTS 962430 2/1975 Canada ................ 524/577

*Primary Examiner*—Fred Teskin
*Attorney, Agent, or Firm*—Parmelee, Bollinger & Bramblett

[57] ABSTRACT

Irregular shaped particles of cross-linked copolymer of styrene-divinylbenzene in which essentially 90% or more of the particles pass through a 100 mesh screen (U.S. Sieve Series) and essentially 50% pass through a 200 mesh screen (U.S. Sieve Series) is produced by high speed attrition milling of relatively inexpensive large-sized copolymer beads. The resulting particles are irregularly shaped cross-linked copolymer particles which are desirable and useful as a filler material for investment casting waxes. The small-sized irregularly-shaped cross-linked copolymer beads produced by high speed attrition milling essentially eliminate any "orange peel" effect on wax pattern surface and also results in improved packing of the wax composition thereby producing high quality precision parts more readily than heretofore possible.

14 Claims, 3 Drawing Sheets

FILLER AND WAX COMPOSITION FOR INVESTMENT CASTING

FIELD OF THE INVENTION

This invention relates to wax compositions for investment casting and to the use of such compositions for investment casting. More particularly, this invention relates to a filler for wax compositions for investment casting, to wax compositions containing filler and to a process for obtaining said filler.

BACKGROUND OF THE INVENTION

Since very ancient times, going back at least to the Shang Dynasty in China, the so-called "lost-wax" process has been employed for the manufacture of castings. Essentially, this process comprises forming a pattern of wax or blends of various suitable waxes and resins. This finished pattern is then invested with a suitable medium, such as a ceramic or refractory slurry, which is then solidified and becomes a mold around the wax pattern. The pattern material or more commonly the wax is then removed from the mold by melting it and/or by burning, and a molten metal is poured into the now empty mold to produce the finished part. Further description of investment casting are found in U.S. Pat. Nos. 3,263,286 and 3,667,979, as well as in the Investment Casting Handbook of the Investment Casting Institute, 1968.

Such a process has many obvious advantages for making parts, especially intricate parts, which cannot be made, for example, by machining. However, the properties of the casting waxes are extremely important for the production of such parts in modern day usage of this process.

A summary of some of the requisite physical properties of such pattern materials is found in the British publication entitled "PATTERN MATERIALS AND THEIR USE IN INVESTMENT CASTING" of the Pattern-Making Committee of the B.I.C.T.A.

One of the major drawbacks in the use of investment casting wax compositions is that conventionally the wax must be injected at temperatures somewhat above room temperature, i.e. 105° F. to 190° F. Waxes are non-Newtonian fluids so that when injected under pressure, they are subjected to shearing forces causing them to become somewhat more fluid. It is not necessary to heat waxes until they are completely liquid in order to completely fill the interstices of a die; nevertheless, they must be heated to some extent. Thus, when injected into a complicated die, thin wax sections cool relatively quickly, reproducing that particular section with a high degree of dimensional accuracy, but the wax in heavier sections will shrink considerably more. Additionally, because of these different rates of cooling and shrinkage, considerable stress can be imposed on the wax pattern, and when removed from the die, the pattern may readily distort in order to relieve the strain.

To a limited extent, such dimensional problems can be compensated for by retooling of the master die. Such retooling is a complicated procedure at best, and in addition, such a tailoring of a die is costly and is not completely reliable. Moreover, heating up of the die with repeated injections, large ambient temperature variations and the like, all further combine to produce a considerable loss of precision in the mass reproduction of pattern dimensions.

This problem in investment casting caused by distortion of the patterns due to shrinkage has long troubled the art. Solution of this problem has been attempted by inclusion of various filler materials in the investment casting wax composition. While this feature has met with some degree of success, it has also introduced some new problems as well as leaving other problems unsolved.

For one thing, the wax composition must be safe to handle as a solid and must be capable of convenient melting or burning out of a mold. It is also essential that the wax composition have a low ash content; that is, about 0.02% or less. It is also necessary that such wax compositions be of sufficient strength and be hard enough at room temperature, so that the patterns be self-supporting and can be handled without damage.

Among the various materials that have been suggested as useful filler for such investment casting wax compositions but which have not met all the desirable physical properties for pattern making or have resulted in new problems there may be mentioned that polystyrene beads can be used as suggested by U.S. Pat. No. 3,465,808. However, during autoclave removal of the wax, the wax melts out first leaving a polystyrene residue that tends to tear the ceramic mold wall.

Moreover, there is an excessive breakage of these ceramic shells, such that they become unsuitable for use as molds for receiving molten metal. This recent occurrence of excessive shell mold breakage occurs during the dewaxing of ceramic shells.

Accordingly, it has been further suggested that an improved type of polystyrene beads that may be employed are beads of a cross-linked styrene-divinylbenzene copolymer. Such material appears to be highly desirable as a filler for investment casting waxes. This cross-linked material is a neutral pH filler and thus will not attack either acid or alkaline sensitive ceramic material in shells for high quality metal castings.

Cross-linked beads of said copolymer have been available for a number of years and yet a number of serious drawbacks are present with such commercially available cross-linked styrene-divinylbenzene copolymer beads. It is to be understood that to be especially suitable and useful for use as a filler in wax compositions for investment casting, the cross-linked material must not be of too large a particle size. If essentially all or at least about 90% of the beads will not pass through a 100 mesh screen one obtains an "orange peel" effect in the casting process and thus the beads are not suitable for investment casting of intricate and/or complex parts.

This size requirement has lead to a significant problem. While cross-linked styrene-divinylbenzene copolymer beads of such desirable size, i.e. essentially all passing through a 100 mesh screen, have been available from Cole Polymers Ltd. in the United Kingdom, the cost of such copolymer beads is only available at a prohibitively high cost of over $3/lb, thus, economically, use in investment casting is precluded. In the United States copolymer beads of such small size are only available in an extremely limited quantity from Dow Chemical Company and at a cost of $12/lb. The only copolymer beads available, at a cost which permits their use as a filler for investment casting, are beads which are too large in size, namely 18 to 100 mesh beads.

Therefore, it is highly desirable that a cross-linked styrene-divinylbenzene copolymer be available at low enough cost, i.e. about $1.00/lb or less, and of a suitable size as stated hereinbefore to enable its use as a filler in investment casting waxes.

DESCRIPTION OF THE DRAWINGS

The invention is illustrated in reference to the accompanying drawings in which.

SUMMARY OF THE INVENTION

Figure 1:
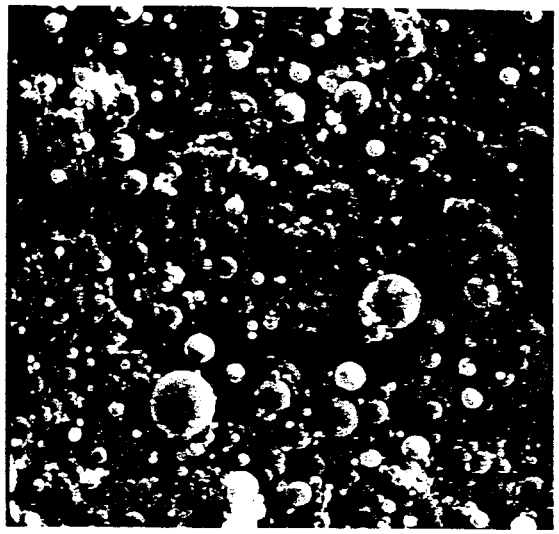
FIGS. 1, 2 and 3 are photos showing the expensive, commercially available Cole Polymers Ltd. cross-linked styrene-divinylbenzene copolymer beads enlarged 200, 360 and 1000 times, respectively.

Irregular shaped particles of cross-linked copolymer of styrene-divinylbenzene in which essentially 90% or more of the particles pass through a 100 mesh screen (U.S. Sieve Series) and essentially 50% pass through a 200 mesh screen (U.S. Sieve Series) is provided by high speed attrition milling of relatively inexpensive large-sized copolymer beads. The resulting particles are irregularly shaped cross-linked copolymer particles which are even more desirable and useful as a filler material for investment casting waxes than the expensive, small-sized spherical beads of copolymer. The small-sized irregularly-shaped cross-linked copolymer beads produced by high speed attrition milling essentially eliminate any "orange peel" effect and also results in improved packing of the wax composition thereby producing high quality precision parts more readily than heretofore possible.

DETAILS OF THE INVENTION

It has been discovered that highly useful and desirable relatively low cost particles of cross-linked styrene-divinylbenzene copolymer especially suitable for use in investment casting can be obtained by subjecting relatively inexpensive, relatively large and thus unsuitable beads of cross-linked styrene-divinylbenzene copolymer to high speed attrition milling thereby producing irregular shaped cross-linked styrene-divinylbenzene copolymer particles in which at least about 90% passes through a 100 mesh screen and at least about 50% passes through a 200 mesh screen. The production of such irregularly shaped particles is accomplished by attrition milling by using high volumes of air for cooling and recirculation of non-sieve passing material. For example, relatively inexpensive, large-sized (18-100 mesh) cross-linked styrene-divinylbenzene copolymer beads, available from Dow Chemical Company as product 81416 and shown in enlarged form in FIGS. 4, 5 and 6, can be subjected to such high speed attrition milling using attrition mills fitted with 80, 100 and/or 120 mesh screens. Such high speed attrition milling equipment is available from Wedco, Inc. of Garwood, N.J., such as their model UR-28 mill. Such high speed attrition milling machines are also disclosed, for example, in U.S. Pat. No. 3,561,685 issued Feb. 9, 1971 and assigned to Wedco, Inc.

Because cross-linked styrene-divinylbenzene copolymer beads have no melting point but instead start to burn at about 230° C. with autoignition occurring above about 560° C., it is not possible to produce the irregular shaped small particles of this invention by hammer milling or a similar crushing operation since the beads agglomerate and fuse together during such a process. Accordingly, it is by the use of high speed attrition milling that the desired irregular shaped, small particles of cross-linked styrene-divinylbenzene copolymer suitable for use as a filler in investment casting waxes can be produced.

The starting material for producing the irregularly shaped particles of this invention can be any suitable relatively large-sized beads of cross-linked styrene-divinylbenzene copolymer having a degree of cross-linking of from about 1 to about 20%, preferably from about 2 to about 12% and most preferably from about 8 to about 10% by weight.

Figure 2:
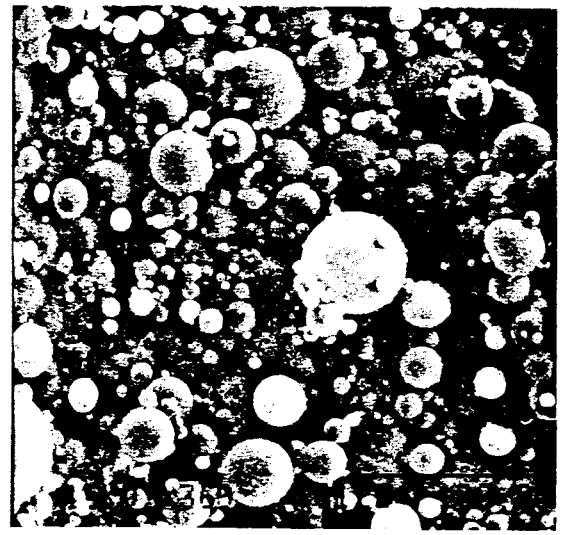
Figure 3:
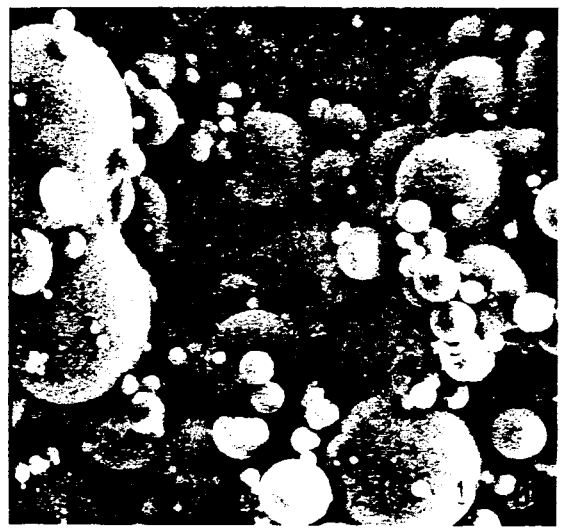
Figure 4:
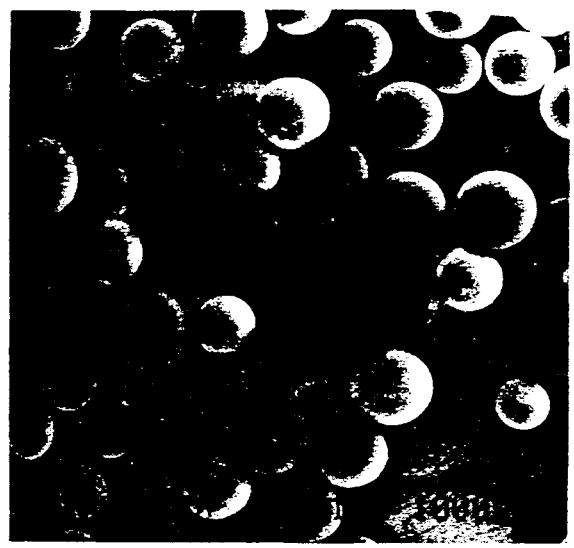
FIGS. 4, 5 and 6 are photos showing the inexpensive, commercially available large sized (18-100 mesh) Dow Chemical Company cross-linked styrene-divinylbenzene copolymer beads enlarged 20, 36 and 100 times, respectively.
Figure 5:
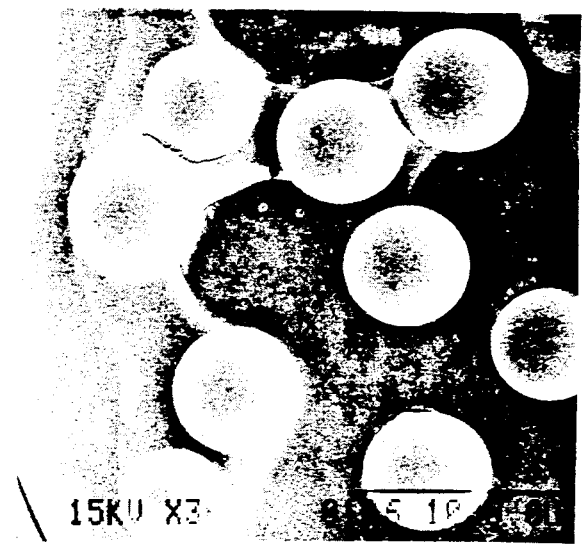
Figure 6:
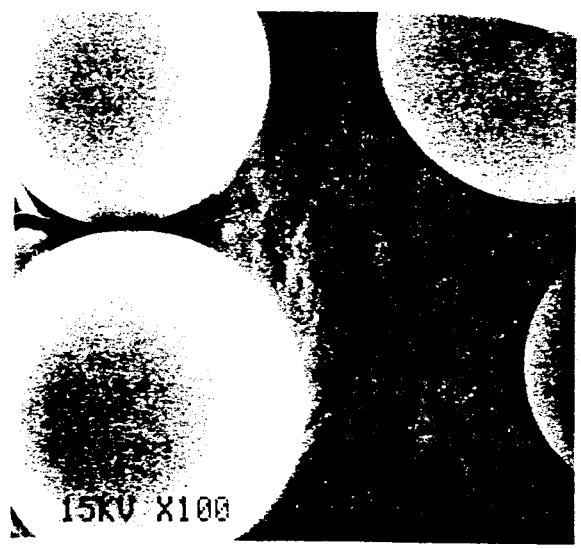
Figure 7:
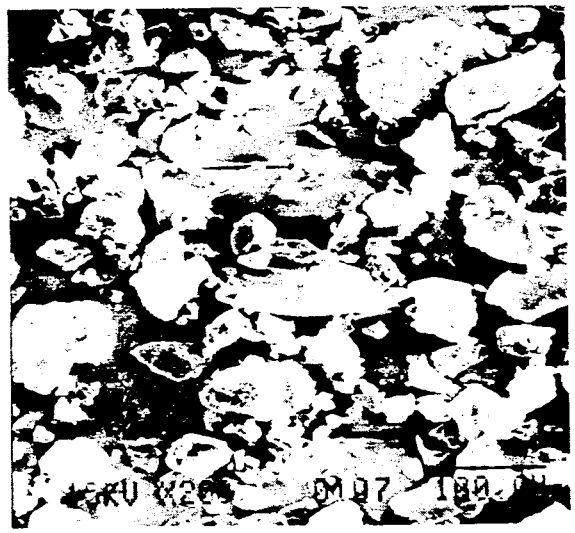
FIGS. 7, 8 and 9 are photos showing the irregular shaped particles of cross-linked styrene-divinylbenzene copolymer produced by high speed attrition milling of large sized beads, enlarged 200, 360 and 1000 times, respectively.
Figure 8:
Figure 9:

The following Table I describes examples of suitable irregularly shaped small particles of cross-linked styrene-divinylbenzene copolymer produced by high speed attrition milling using high volume of air for cooling and recirculation of non-sieve passing particles. Also included in Table I is a description of both (1) the Cole Polymers Ltd. produced small-sized beads of cross-linked styrene-divinylbenzene copolymer beads which although having a suitable size for use as a filler in investment casting wax compositions is prohibitively expensive for such use and (2) the large-sized cross-linked styrene-divinylbenzene copolymer beads available from Dow Chemical Company as Product 81416 which although inexpensive are too large for use as a filler in investment cast wax compositions. The Cole Polymers Ltd. beads are also shown in FIGS. 1, 2 and 3 wherein said beads are magnified 200, 360 and 1000 times, respectively, and the Dow Chemical Company beads, employed as the starting material to produce the irregularly shaped small particles of this invention, are shown in FIGS. 4, 5 and 6 wherein said beads are magnified 20, 36 and 100 times, respectively. Typical irregularly shaped small particles of this invention produced by high speed attrition milling of large-sized cross-linked styrene-divinylbenzene copolymer, Compositions A through H of Table I, are shown in FIGS. 7, 8 and 9 wherein the particles are magnified 200, 360 and 1000 times, respectively. Compositions A through H of this invention were produced in a Wedco Inc. high speed attrition mill, such as a Model UR-28 mill, employing 80, 100 and 120 mesh screen in said mill. It will be recognized that other suitable high speed attrition milling equipment could be employed to produce the particles of this invention.

TABLE I

| COMPOSITION | ATTRITION MILL SCREENS (mesh) | MATERIAL ANALYSIS (% on or thru Screen) | | | | | | Thru 250 |
|---|---|---|---|---|---|---|---|---|
| | | 60 | 80 | 100 | 140 | 200 | 250 | |
| Cole Polymers Ltd. | — | | | | 1.1 | 5.4 | 5.6 | 87.9 |
| Dow Product 81416 | — | 65.7 | 26.8 | 4.8 | 2.7 | | | |
| Composition A | 100/100 | | | 3.0 | 22.5 | 30.9 | 8.8 | 34.8 |
| Composition B | 80/80 | | | 7.7 | 18.9 | 25.5 | 14.5 | 33.4 |

TABLE I-continued

| COMPOSITION | ATTRITION MILL SCREENS (mesh) | MATERIAL ANALYSIS (% on or thru Screen) | | | | | | Thru 250 |
|---|---|---|---|---|---|---|---|---|
| | | 60 | 80 | 100 | 140 | 200 | 250 | |
| Composition C | 80/80 | | | 5.1 | 31.3 | 17.9 | 10.5 | 35.2 |
| Composition D | 80/10 | 0.3 | 1.1 | 7.5 | 29.1 | 19.3 | 10.3 | 32.4 |
| Composition E | 80/100 | | | 12.9 | 29.4 | 20.1 | 7.2 | 30.4 |
| Composition F | 120 | 0.1 | 0.2 | 1.1 | 1.7 | 4.9 | 6.5 | 85.7 |
| Composition G | 120 | | | | 7.0 | 32.7 | 9.9 | 50.5 |
| Composition H | 120 | | | 0.9 | 14.7 | 36.1 | 22.4 | 25.9 |

Compositions A through H of this invention are merely exemplary of the irregularly shaped particles that can be produced according to this invention. The irregularly shaped small particles of this invention will be characterized by having at least about 90% by weight pass through a 100 mesh screen and at least about 50% by weight pass through a 200 mesh screen. Compositions A through G of Table I contain about 8 to about 10% cross-linking of the copolymer and Composition H about 2% cross-linking. Compositions A through H were produced in the high speed Wedco Inc. attrition mill at rates ranging from about 50 lbs/hour for Composition A to about 237 lbs/hour for Composition G. For example, Compositions B and D were produced at the rate of about 150 lbs/hour, Composition E at about 90 lbs/hour and Composition F at about 136 lbs/hour. One can of course vary the rate of milling, and the mill screen employed as well as other processing conditions to produce irregularly shaped particle material meeting the required size characteristics of this invention.

In accordance with this invention, the irregularly shaped cross-linked styrene-divinylbenzene copolymer particles of this invention in which about 90% by weight pass through a 100 mesh screen and about 50% by weight pass through a 200 mesh screen are especially suitable for use as a filler for investment casting wax composition. The particles are incorporated in an amount of from about 5 to about 60%, preferably from about 10 to about 55%, and more preferably from about 15 to about 45%, by weight into a base wax composition suitable for use in investment casting and particularly for use as a pattern wax.

The wax composition of the present invention thus contains the irregularly shaped particles in any suitable base wax composition The wax generally constitutes from about 40 to 95% by weight, more generally from about 45 to 90%, and most preferably from about 55 to 85% by weight of the final composition.

Suitable base wax compositions can include petroleum waxes, natural vegetable or mineral waxes, synthetic waxes and various resinous materials derived from the refining of petroleum and wood resins, terpene-type resins or mixtures of these materials or any of those waxes disclosed in the prior art patents mentioned previously. The base wax compositions can thus contain one or more hydrocarbon materials or other organic materials having for instance, oxygen-containing groups, as in the case of stearic acid or abietic acid, or nitrogen-containing groups such as in the case of amides. The base wax compositions usually melt at temperature in the range of about 120° to about 200° F.

A suitable base wax consists essentially of 0 to 15% vegetable wax, 20 to 60% of petroleum wax consisting of mixtures of paraffin waxes having a melting point of from 120° to 160° F. and microcrystalline waxes having a melting point of from 135° to 205° F., 1 to 12% of synthetic waxes such as Fisher-Tropsch waxes, polyethylene, ethylene vinyl acetate, or amides, and about 13 to 70% of various resins, such as hydrocarbon resins, or resins derived from the refining of petroleum or of wood products, particularly those known as polyterpene resins. The preferred vegetable waxes are candellila and carnauba waxes. These base waxes are well known in the art and, therefore, they need not be described further.

The final form of the wax composition containing the irregularly shaped particle filler can be in flake, slab or billet form or other suitable forms. Such compositions are of low ash content, generally below about 0.02% by weight. Additionally, to be suitable as a wax for investment casting, the wax must be of sufficient hardness to form acceptable patterns with minimal shrinkage. Such particle containing investment casting waxes have a hardness based on the ASTM D-5 needle penetration test using the investment Casting Institute modification of a 450 gm total weight on the needle-point, of between 5 to 15 and possibly from 2 to 25 or 30 tenths of millimeters (dmm). This Investment casting Institute needle penetrometer testing procedure is described in the publication dated November 1971, entitled: Standard Material Specification for Pattern Materials by the Investment Casting Institute, in the section entitled: "Determination of Consistency-Needle Penetration Method".

The following specific examples are illustrative of the improved investment casting wax compositions of the present invention and their use. Exemplary investment casting wax compositions of this invention are described in Examples I to III in which "CLSDVB particles " refers to irregularly shaped cross-linked styrene-divinylbenzene particles of this invention, such as Composition G of Table I.

EXAMPLE I

| EXAMPLE I | | |
|---|---|---|
| 6.2 | weight percent | Carnauba wax |
| 29.9 | " | C$_5$ hydrocarbon resin |
| 6.8 | " | Microcrystalline Wax 178° F. (ASTM/D127) |
| 3.9 | " | Microcrystalline Wax 171° F. |
| 9.6 | " | Paraffin Wax 145° F. (AMP) |
| .8 | " | Polyethylene 222° F. (ASTM/E28) |
| 42.8 | " | CLSDVB particles. |

EXAMPLE 2

| EXAMPLE 2 | | |
|---|---|---|
| 40 | weight percent | Polyterpene resin 135° C. (ASTM/E28) |
| 21.6 | " | Paraffin 156° F. (AMP) |
| 14.4 | " | Microcrystalline Wax 178° F. (ASTM/D127) |
| 4.0 | " | Polyethylene 244-262° F. |

-continued

| | EXAMPLE 2 | |
|---|---|---|
| 20 | " | (ASTM/D566) CLSDVB particles. |

The polyterpene resin has a specific gravity of 0.995 (25°/25° C.) and a ball and ring softening point of about 135°.

EXAMPLE III

| | EXAMPLE III | |
|---|---|---|
| 35 | weight percent | Polyterpene resin 115° C. (ASTM/E28) |
| 19 | " | Paraffin Wax 145° F. (AMP) |
| 12.5 | " | Microcrystalline Wax 178° F. (ASTM/D127) |
| 3.5 | " | Polyethylene 130° C. (ASTM/E28) |
| 30 | " | CLSDVB particles. |

The polyterpene resin product, has a specific gravity of 0.995 (25°/25° C.) and a ball and ring softening point of about 115° C.

Completely acceptable patterns are made with the aforementioned wax compositions containing cross-linked styrene-divinylbenzene copolymer particles as a filler according to known investment casting techniques.

In another aspect of this invention, a method of investment casting is provided wherein the cross-linked styrene-divinylbenzene copolymer particles containing wax compositions are utilized. In such a process a low shrinkage, dimensionally stable, fast setting casting wax having cross-linked styrene-divinylbenzene copolymer particles as a filler, such as those described in Examples I and III, is injected into a suitable die for making a wax pattern. The hardened wax pattern is removed from the die. The pattern or a cluster of such patterns is/are gated to a wax sprue. Then, the sprued pattern or patterns are utilized in either the solid mold investment casting process or the investment shell casting process.

In the solid mold investment casting process, the sprued pattern(s) is invested in a mold slurry which is allowed to harden.

In the investment shell casting process, the sprued pattern(s) is dipped in a slurry of finely divided ceramic material, and a refractory grain is then sifted onto the coating. After suitable drying time, this process of dipping and sifting is repeated several times to build up a desired shell thickness.

In either of the above processes, the cross-linked styrene-divinylbenzene copolymer particles containing wax composition is removed from the ceramic mold by melting in an oven, over a steam bath, or in an autoclave. The ceramic mold is then fired at high temperature to remove the last traces of the wax composition and to cure the ceramic mold itself. Molten metal is then poured into the ceramic mold and allowed to harden. The mold material is then broken away from the castings, the castings removed from the resultant metal sprue, and suitably finished. A more detailed description of these investment casting processes can be found in the Investment Casting Handbook referred to above.

I claim:

1. A composition comprising irregularly shaped particles of cross-linked styrene-divinylbenzene copolymer produced by attrition milling of cross-linked styrene-divinylbenzene copolymer, wherein at least about 90% by weight of the irregularly shaped particles passes through a 100 mesh screen and about 50% by weight of said particles passes through a 200 mesh screen.

2. A composition of claim 1 wherein the degree of cross-linking is from about 2 to about 12% by weight.

3. A composition of claim 2 wherein the degree of cross-linking is from about 8 to about 10% by weight.

4. In an investment casting wax composition for use in an investment casting wax process, the improvement wherein irregularly shaped cross-linked styrene-divinylbenzene copolymer particles are present in the composition as a filler and wherein at least about 90% by weight of said particles pass through a 100 mesh screen and about 50% by weight of said particles pass through a 200 mesh screen.

5. An investment casting wax composition of claim 4 wherein the degree of cross-linking of the copolymer is from about 2 to 12% by weight.

6. An investment casting wax composition of claim 5 wherein the degree of cross-linking of the copolymer is from about 8% to about 10% by weight.

7. An investment casting wax composition of claim 5 wherein the particles comprise from about 5 to about 60% by weight of the investment casting wax composition.

8. An investment casting wax composition for use in the investment casting wax process which consists essentially of a base wax melting in the range of 120° to 200° F. and, as a filler, about 5 to 60% by weight of the final composition of irregularly shaped cross-linked styrene-divinylbenzene copolymer particles wherein at least about 90% by weight of said particles pass through a 100 mesh screen and at least about 50% by weight passes through a 200 mesh screen, said wax composition having sufficient hardness to form acceptable patterns and said wax composition being dimensionally stable.

9. An investment casting wax composition of claim 8 of the following composition: 40 weight percent of polyterpene resin having a specific gravity of 0.995 (25°/25° C.) and a ball and ring softening point of about 135° C.; 21.6 weight percent of paraffin wax having a softening point at about 156° F.; 14.4 weight percent of microcrystalline wax having a softening point at about 178° F.; 4.0 weight percent of polyethylene softening in the range of 244° to 262° F. and 20 weight percent of said particle filler.

10. An investment casting wax composition of claim 8 of the following composition: 35 weight percent of polyterpene resin having a specific gravity of 0.995 (25°/25° C.) and a ball and ring softening point of about 115° C.; 19 weight percent of paraffin wax having a softening point of about 145° F.; 12.5 weight percent of microcrystalline wax having a softening point of about 178° F.; 3.5 weight percent of polyethylene having a ball and ring softening point of about 130° C.; and 30 weight percent of said particle filler.

11. A composition of claim 8 wherein the base wax comprises about 0 to 15% by weight vegetable wax, about 20 to 60% by weight petroleum wax consisting of a mixture of paraffins having a melting point of from 120° to 160° F. and microcrystalline waxes having a melting point of from about 135° to 205° F., about 1 to 12% by weight synthetic waxes and about 13 to 79% by weight of resin.

12. A composition of claim 11 wherein the vegetable wax is carnauba wax.

13. A composition of claim 11 wherein the vegetable wax is candellila wax.

14. A low shrinkage, dimensionally stable investment casting wax composition having sufficient hardness to form acceptable patterns for use in the investment casting wax process which consists essentially of a base wax melting in the range of 120° to 200° F. and, as a filler, irregularly shaped cross-linked styrene-divinylbenzene copolymer particles wherein at least about 90% by weight of said particles pass through a 100 mesh screen and at least about 50% by weight passes through a 200 mesh screen.

* * * * *